Dec. 11, 1945.   C. HARTLEY   2,390,585
DISCONNECT SWITCH
Filed Feb. 15, 1943
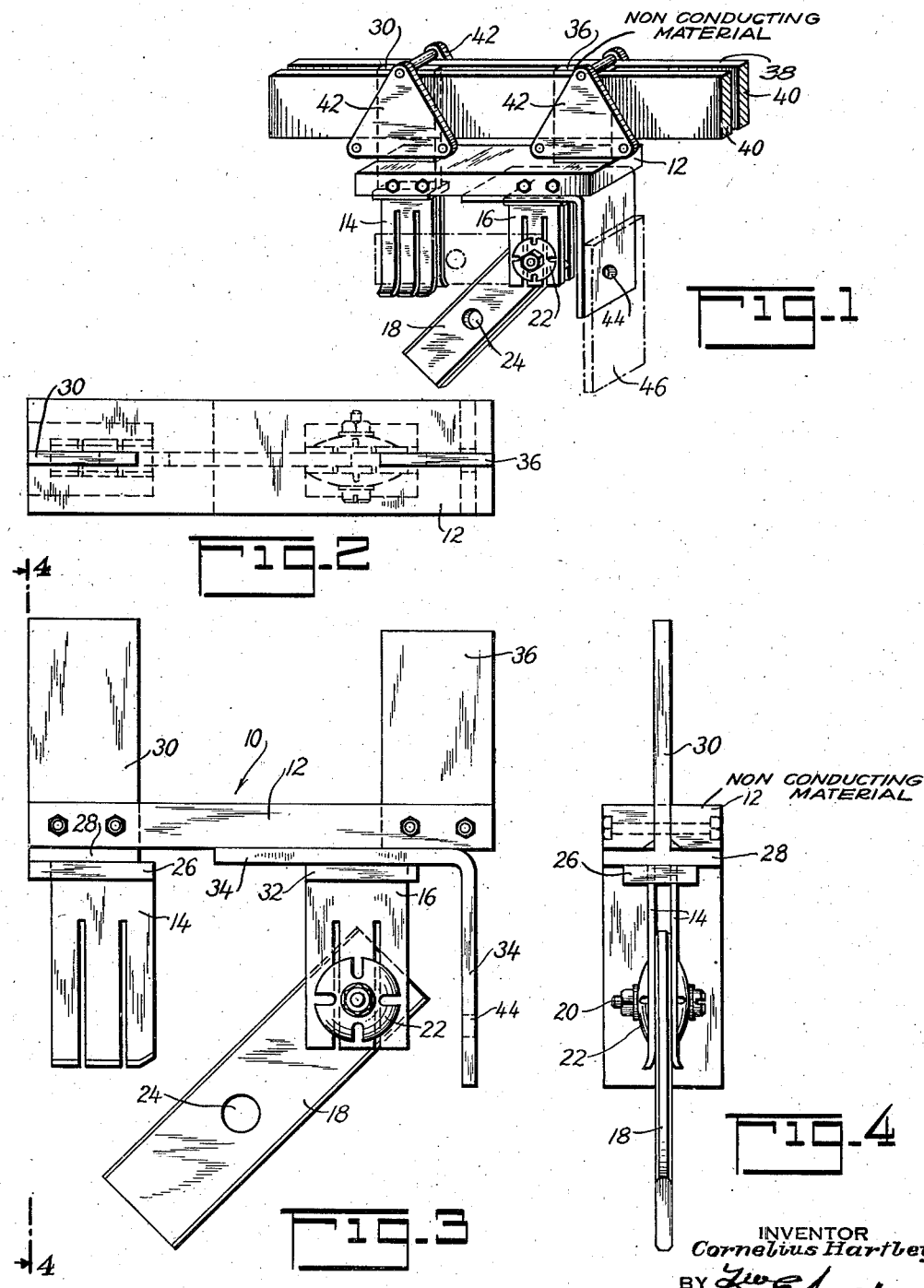
INVENTOR
Cornelius Hartley.
BY
ATTORNEY Patented Dec. 11, 1945

2,390,585

UNITED STATES PATENT OFFICE 2,390,585

DISCONNECT SWITCH

Cornelius Hartley, Prospect Park, N. J., assignor to Wright Aeronautical Corporation, a corporation of New York Application February 15, 1943, Serial No. 476,012

3 Claims. (Cl. 200—162)

This invention relates to electric switches and is particularly concerned with the manner in which a special disconnect switch is secured directly to the bus bars.

In accordance with conventional power plant practice, electric energy is supplied to bus bars generally of laminated construction and bus bars feeding various branch circuits are tapped into the supply bus bars. It is also conventional practice to provide manually operable disconnect switches between the supply and branch circuit bus bars. In accordance with this conventional practice these disconnect switches are mounted on panels and thereby require separate bus bar connections between the switch and the supply and branch bus bars. Also, these switch panels obstruct and hinder access to any auxiliary electric equipment such as an oil circuit breaker which is conventionally located in the branch circuit at the junction with the supply buses.

It is an object of this invention to provide a mounting means for a branch circuit disconnect switch of a construction such that the switch may be secured directly to the supply bus bars, and the necessity for a separate and obstructing switch panel is eliminated. Other objects of the invention will become apparent in reading the annexed detailed description in connection with the drawing, in which:

Fig. 1 illustrates the manner in which the switch is secured to the supply and branch bus bars;

Fig. 2 is a plan view of the switch;

Fig. 3 is a side elevation of the switch; and

Fig. 4 is an end elevation of the switch as viewed along the line 4—4 of Fig. 3.

Referring first to Figs. 2 to 4, the switch 10 comprises an insulated base or body portion 12 upon which are mounted two pairs of finger type switch terminals 14 and 16. A switch arm 18 is pivotally mounted between the pair of fingers 16 by means of a bolt 20 and spring washers 22 for movement to and from a closed circuit position between the spring fingers 14. An opening 24 is provided in the switch arm so that the switch may be operated by a suitable tool or handle (not shown).

The switch terminal members 14 are mounted on a base portion 26 rigidly secured to the head portion 28 of a T-shaped contact strip 30. The stem portion of the contact strip 30 extends through and is secured to the base 12 for cooperation with the supply bus bars as hereinafter described.

The other pair of switch terminals 16 is mounted on the base portion 32 which is rigidly secured to the angle-shaped connector member 34 mounted on the base 12. An insulated strip 36 is secured to the base 12 in alinement with the stem portion of the connector strip 30 but at the opposite end of the base 12.

Now referring to Fig. 1, a laminated supply bus bar structure is illustrated at 38 and comprises two or more parallel disposed bus bars 40. The flat strips 30 and 36 are each inserted and clamped between a pair of supply bus bars 40 by a pair of triangular-shaped clamping plates 42 bolted together about the bus bars 40 and strips 30 or 36. The connector strip 30 not only helps to support the switch 10 but it also provides an electric connection from the supply bus bars to the terminal 14 of the switch. The strip 36 is of insulating material and provides an additional support for the switch. The angle connector 34 is provided with a hole 44 to facilitate bolting to the branch bus bar 46 which may lead to an oil circuit breaker or other electric auxiliary located below the switch and in the branch circuit.

The above described construction eliminates the necessity of separate switch panels with separate bus bar connections thereto from the supply and branch circuits. Also, switches for additional branch circuits may be readily connected to the supply bus bars without opening the supply circuit and shutting down the associated branch circuits. Thus, if necessary, the supply bus bars of opposite polarity (not shown) from bus bars 38 may be covered to prevent contact therewith and if suitable precautions are taken to prevent contact with ground, additional switches 10 may be readily installed on bus bars 38 without interrupting the supply circuit.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A switch adapted to be secured directly to a laminated bus bar structure, said switch comprising a body portion, a pair of switch contacts secured to said body portion, a switch arm operable to bridge said contacts, a flat electrically conducting strip having one end connected to one of said contacts and having its other end extending from said switch body portion, and a second flat strip insulated from the other of said contacts and extending from said switch body portion in spaced relation and parallel to said first mentioned strip, said two spaced flat strips each being adapted to be clamped between the laminations of said bus bar structure at spaced points thereon such that there is substantially no voltage difference between said points whether said switch is open or closed.

2. A switch adapted to be secured directly to a laminated bus bar structure, said switch comprising a base member, a pair of switch contacts mounted on one side of said base member, a switch arm operable to bridge said contacts, and flat strip means connected to one of said switch contacts and extending from the opposite side of said base member, said flat strip means being adapted to be clamped between the laminations of said bus bar structure for supporting said switch therefrom and electrically connecting said one switch contact thereto.

3. A switch adapted to be secured to a laminated bus bar structure and comprising a base member, a pair of switch contacts mounted on one side of said base member, a switch arm operable to bridge said contacts, a flat electrically conducting strip connected to one of said switch contacts and extending from the opposite side of said base member, and a second flat strip insulated from the other of said switch contacts and extending parallel to said first mentioned strip from the same side of said base member as said first mentioned strip but in spaced relation thereto, said flat strips being adapted to be clamped between and secured to the laminations of said bus bar structure for supporting said switch therefrom and electrically connecting said one switch contact thereto.

CORNELIUS HARTLEY.